(12) United States Patent
Xu et al.

(10) Patent No.: US 10,404,153 B2
(45) Date of Patent: *Sep. 3, 2019

(54) CONTROL CIRCUIT FOR VOLTAGE REGULATOR WITH REFERENCE SIGNAL GENERATING AND ASSOCIATED METHOD

(71) Applicant: Chengdu Monolithic Power Systems Co., Ltd., Chengdu (CN)

(72) Inventors: Binci Xu, Hangzhou (CN); Lijie Jiang, Hangzhou (CN); Chao Liu, Sunnyvale, CA (US); Tao Zhao, San Jose, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,312

(22) Filed: May 18, 2018

(65) Prior Publication Data

US 2018/0337585 A1 Nov. 22, 2018

(30) Foreign Application Priority Data

May 22, 2017 (CN) .......................... 2017 1 0368496

(51) Int. Cl.
*H02M 1/00* (2006.01)
*H02M 3/04* (2006.01)
*H02M 3/158* (2006.01)
*G06F 1/28* (2006.01)
*H02M 3/157* (2006.01)
*H02M 1/44* (2007.01)

(52) U.S. Cl.
CPC ............... *H02M 1/00* (2013.01); *H02M 3/04* (2013.01); *H02M 3/1588* (2013.01); *G06F 1/28* (2013.01); *H02M 1/44* (2013.01); *H02M 3/157* (2013.01); *H02M 2001/0025* (2013.01)

(58) Field of Classification Search
CPC .. H02M 3/04; H02M 1/00; H02M 2001/0025; H02M 1/44; H02M 3/1584; H02M 3/157; H02M 3/156; H02M 3/158; H02M 2001/0009; H02M 3/1588; G06F 1/26; G06F 1/28; G06F 1/266
See application file for complete search history.

(56) References Cited

U.S. PATENT DOCUMENTS 8,791,676 B2    7/2014  Chao
2005/0057212 A1*  3/2005  Harbaugh ............... H02P 21/22
                                                         318/809

(Continued)

OTHER PUBLICATIONS

U.S. Appl. No. 15/383,892, filed Dec. 19, 2016, Jeff.
U.S. Appl. No. 15/842,797, filed Dec. 14, 2017, Suhua.

*Primary Examiner* — Gustavo A Rosario-Benitez
(74) *Attorney, Agent, or Firm* — Perkins Coie LLP

(57) ABSTRACT

A method for controlling a voltage regulator is receiving a voltage identification code which has a pulse width modulation signal, providing a duty signal via measuring a duty cycle of the pulse width modulation signal, calculating a target voltage based on the duty signal, providing a reference signal via filtering the duty signal by a first filter if the voltage identification code varies, and providing the reference signal via filtering the duty signal by a second filter if the reference signal is in a range determined by the target voltage.

19 Claims, 8 Drawing Sheets

(56) References Cited

U.S. PATENT DOCUMENTS

| | | | |
|---|---|---|---|
| 2006/0055388 A1* | 3/2006 | Tang | H02M 3/1584 |
| | | | 323/284 |
| 2007/0182391 A1* | 8/2007 | Chapuis | H02M 3/157 |
| | | | 323/282 |
| 2013/0086396 A1* | 4/2013 | Liu | G06F 1/26 |
| | | | 713/300 |
| 2014/0049232 A1* | 2/2014 | Chen | G05F 1/10 |
| | | | 323/234 |
| 2014/0125306 A1* | 5/2014 | Babazadeh | G05F 5/00 |
| | | | 323/285 |
| 2016/0079851 A1* | 3/2016 | Babazadeh | H02M 3/157 |
| | | | 323/271 |
| 2017/0019026 A1* | 1/2017 | Nien | H02M 3/1584 |
| 2017/0248996 A1* | 8/2017 | Zhang | G06F 1/26 |
| 2017/0288648 A1* | 10/2017 | Tang | H03K 3/012 |
| 2018/0248482 A1* | 8/2018 | Babazadeh | H02M 1/084 |
| 2018/0337589 A1* | 11/2018 | Xu | H02M 1/14 |

* cited by examiner

US 10,404,153 B2

CONTROL CIRCUIT FOR VOLTAGE REGULATOR WITH REFERENCE SIGNAL GENERATING AND ASSOCIATED METHOD

CROSS-REFERENCE TO RELATED APPLICATION

This application claims the benefit of CN application No. 201710368496.1, filed on May 22, 2017, and incorporated herein by reference.

TECHNICAL FIELD

The present invention relates to electrical circuit, more particularly but not exclusively relates to control circuit for voltage regulator and associated method.

BACKGROUND

In a computer system, an operating voltage of a processor needs to be adjusted to accommodate different operating mode. The processor comprises Central Processing Unit (CPU) and Graphic Processing Unit (GPU) for example. Generally, a voltage regulator is employed to adjust the operating voltage based on a voltage identification (VID) code received from the processor.

The voltage regulator provides a reference signal based on the voltage identification code, and the voltage regulator converts an input voltage to an output voltage based on the reference signal. The output voltage is used as the operating voltage of the processor. The voltage identification code may have a pulse width modulation signal compatible with an NVIDIA processor. However, it is demanding to get the reference signal having both fast response and high accuracy based on the voltage identification code.

SUMMARY

It is one of the objects of the present invention to provide a method for controlling a voltage regulator, and associated control circuit to solve the above problems.

One embodiment of the present invention discloses a method for controlling a voltage regulator, wherein the voltage regulator has a power switch and the voltage regulator is configured to convert an input voltage to an output voltage based on a reference signal, the method comprising: receiving a voltage identification code, the voltage identification code comprising a pulse width modulation signal; providing a duty signal via measuring a duty cycle of the pulse width modulation signal; calculating a target voltage corresponding to the voltage identification code based on the duty signal; providing the reference signal via filtering the duty signal by a first filter if the voltage identification code varies; providing the reference signal via filtering the duty signal by a second filter if the reference signal is in a range determined by the target voltage, and a bandwidth of the first filter is larger than a bandwidth of the second filter; and providing a switching control signal to control the power switch based on the reference signal and a feedback signal representative of the output voltage.

Another embodiment of the present invention discloses a control circuit for a voltage regulator, wherein the voltage regulator has a power switch and the voltage regulator is configured to provide an output voltage based on a reference signal, the control circuit comprising: a reference generating circuit, configured to receive a voltage identification code and to provide the reference signal based on the voltage identification code, wherein the reference signal is provided by a first filter if the voltage identification code varies, and the reference signal is provided by a second filter if the reference signal is in a range determined by a target voltage corresponding to the voltage identification code, and a bandwidth of the first filter is larger than a bandwidth of the second filter; and a switching control circuit, configured to provide a switching control signal to control the power switch based on the reference signal and a feedback signal representative of the output voltage.

Yet another embodiment of the present invention discloses a method for controlling a voltage regulator, wherein the voltage regulator has a power switch which is turned ON and OFF to regulate an output voltage based on a reference signal, the method comprising: receiving a voltage identification code, the voltage identification code comprising a pulse width modulation signal; providing a duty signal via measuring a duty cycle of the pulse width modulation signal; providing the reference signal via filtering the duty signal by a first function if the voltage identification code varies; providing the reference signal via filtering the duty signal by a second function if the reference signal is in a range determined by a target voltage corresponding to the voltage identification code; and providing a switching control signal to control the power switch based on the reference signal and a feedback signal representative of the output voltage.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to a control circuit for a voltage regulator with a reference signal generating and associated method. The control circuit receives a voltage identification code and provides a reference signal accordingly to regulate an output voltage of the voltage regulator. The present invention provides the reference signal with high accuracy and fast response to variation of the voltage identification code. If the voltage identification code varies, the reference signal is provided by filtering a duty signal with a first function, for example, the reference signal changes with a first time constant. The duty signal is obtained based on the voltage identification code. And if the reference signal is in a range determined by a target voltage corresponding to the voltage identification code, the reference signal is provided by filtering the duty signal with a second function, for example, the reference signal changes with a second time constant. A bandwidth of the first function is larger than a bandwidth of the second function, and the first time constant is smaller than the second time constant. In this invention, "time constant" is associated with a response time period. For example, time constant is a time period that the reference signal changes to (1−1/e) times of a predicted variation range, i.e., about 0.63 times of the predicted variation range.

Figure 1:
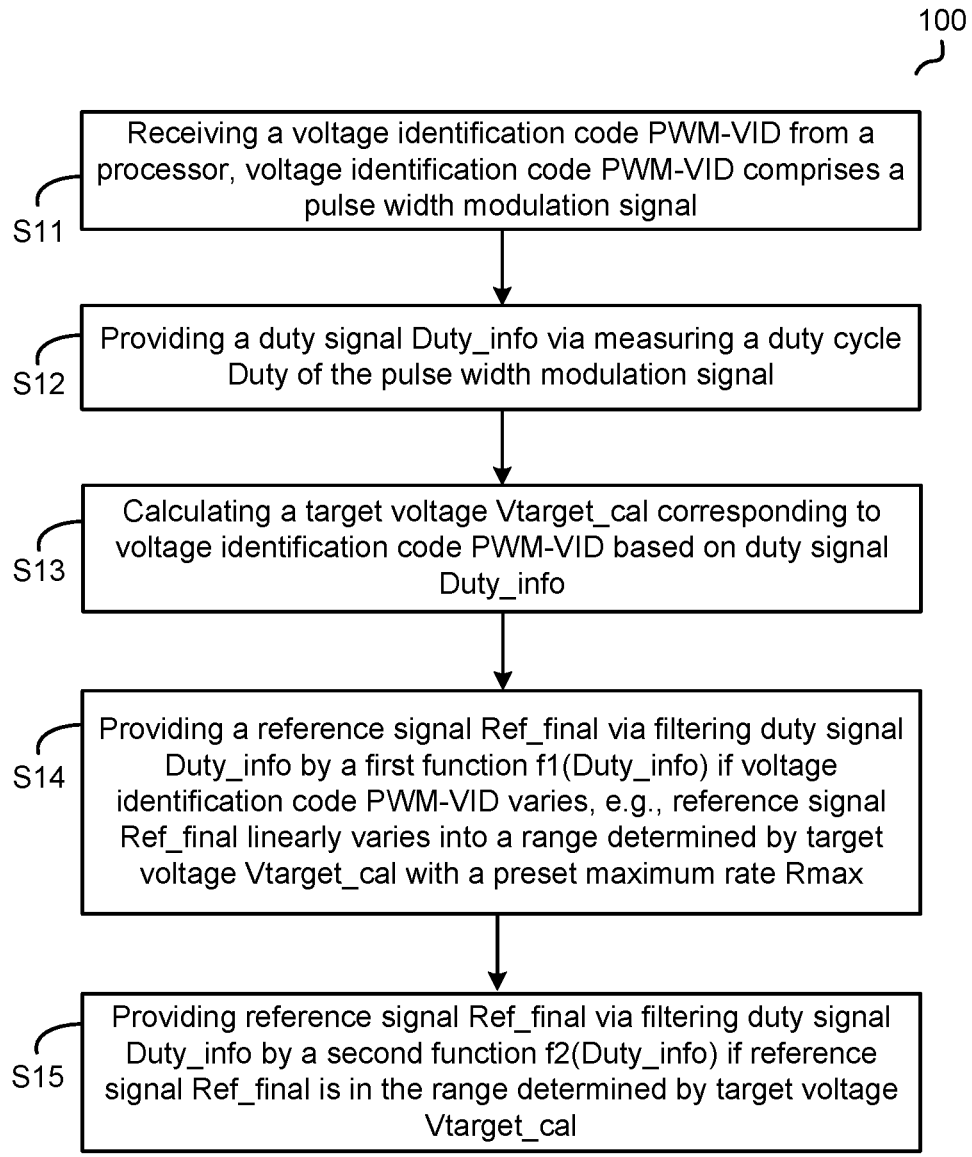
FIG. 1 shows a flow chart 100 illustrating a method for generating a reference signal according to an embodiment of the present invention.

FIG. 1 shows a flow chart 100 illustrating a method for generating a reference signal according to an embodiment of the present invention. The method illustrated by flow chart 100 comprises steps S11-S15. At step S11, receiving a voltage identification code PWM-VID from a processor, voltage identification code PWM-VID comprises a pulse width modulation signal. The pulse width modulation signal with different duty cycle is corresponding to different operating voltage Vtarget the processor needed. At step S12, providing a duty signal Duty_info via measuring a duty cycle Duty of voltage identification code PWM-VID, i.e., measuring duty cycle Duty of the pulse width modulation signal. For example, duty cycle Duty of the pulse width modulation signal is measured by detecting a time period during which the pulse width modulation signal maintains at a high voltage level. At step S13, calculating a target voltage Vtarget_cal corresponding to voltage identification code PWM-VID based on duty signal Duty_info. At step S14, providing a reference signal Ref_final via filtering duty signal Duty_info with a first function f1(Duty_info) if voltage identification code PWM-VID varies, and it is judged that reference signal Ref_final demands dynamic regulation. In one embodiment, providing reference signal Ref_final via filtering duty signal Duty_info with first function f1(Duty_info) comprises that reference signal Ref_final linearly changes into a range determined by target voltage Vtarget_cal with a preset maximum rate R max. At step S15, providing reference signal Ref_final via filtering duty signal Duty_info with a second function f2(Duty_info) if reference signal Ref_final is in the range determined by target voltage Vtarget_cal. A bandwidth of the first function f1(Duty_info) is larger than a bandwidth of the second function f2(Duty_info).

In one embodiment, it is judged that voltage identification code PWM-VID varies when a difference between target voltage Vtarget_cal and reference signal Ref_final is larger than a preset value E1. In another embodiment, it is judged that voltage identification code PWM-VID varies when variation of duty cycle Duty of the pulse width modulation signal exceeds a preset range. In one embodiment, reference signal Ref_final is recognized as in the range determined by target voltage Vtarget_cal when reference signal Ref_final increases to larger than the sum of target voltage Vtarget_cal and a rising threshold up_threshold. Rising threshold up_threshold is programmable, and is larger than or equal to zero. In one embodiment, reference signal Ref_final is recognized as in the range determined by target voltage Vtarget_cal when reference signal Ref_final decreases to less than the sum of target voltage Vtarget_cal and a falling threshold down_threshold. Falling threshold down_threshold is programmable, and is larger than or equal to zero.

In one embodiment, a relationship between operating voltage Vtarget of the processor and duty cycle Duty of the pulse width modulation signal is expressed by following equation (1):

$$V\text{target}=(V\max-V\min)*\text{Duty}+V\min \quad (1)$$

Where, V max is a value of operating voltage Vtarget when corresponding duty cycle Duty of the pulse width modulation signal is 100%, and V min is a value of operating voltage Vtarget when corresponding duty cycle Duty of the pulse width modulation signal is zero.

In one embodiment, target voltage Vtarget_cal increases when duty signal Duty_info increases, and target voltage Vtarget_cal decreases when duty signal Duty_info decreases. For example, target voltage Vtarget_cal can be obtained by following equation (2):

$$V\text{target\_cal}=(V\max-V\min)*\text{Duty\_info}+V\min \quad (2)$$

Figure 2:
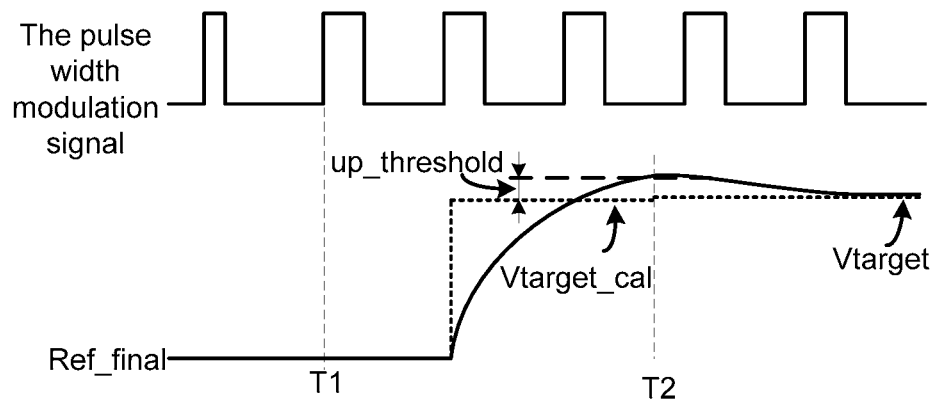
FIG. 2 shows waveform of reference signal when duty cycle of voltage identification code increases according to an embodiment of the present invention.

FIG. 2 shows waveform of reference signal Ref_final when duty cycle Duty of the pulse width modulation signal increases according to an embodiment of the present invention. In the embodiment shown in FIG. 2, at time T1, voltage identification code PWM-VID varies, duty cycle Duty of the pulse width modulation signal increases and it is judged that reference signal Ref_final demands dynamic regulation, e.g., dynamic increase. After a first delay time period, duty signal Duty_info increases, and target voltage Vtarget_cal increases correspondingly. Reference signal Ref_final is provided via filtering duty signal Duty_info by the first function f1(Duty_info), e.g., reference signal Ref_final increases with the first time constant. Until time T2, reference signal Ref_final increases to larger than the sum of target voltage Vtarget_cal and rising threshold up_threshold, and reference signal Ref_final is recognized as in the range determined by target voltage Vtarget_cal. As a result, reference signal Ref_final is provided via filtering duty signal Duty_info by the second function f2(Duty_info), e.g., reference signal Ref_final changes with the second time constant to approach operating voltage Vtarget. In one embodiment, an initial value of function f2(Duty_info) equals reference signal Ref_final when transits to the second function f2(Duty_info) from the first function f1(Duty_info).

Figure 3:
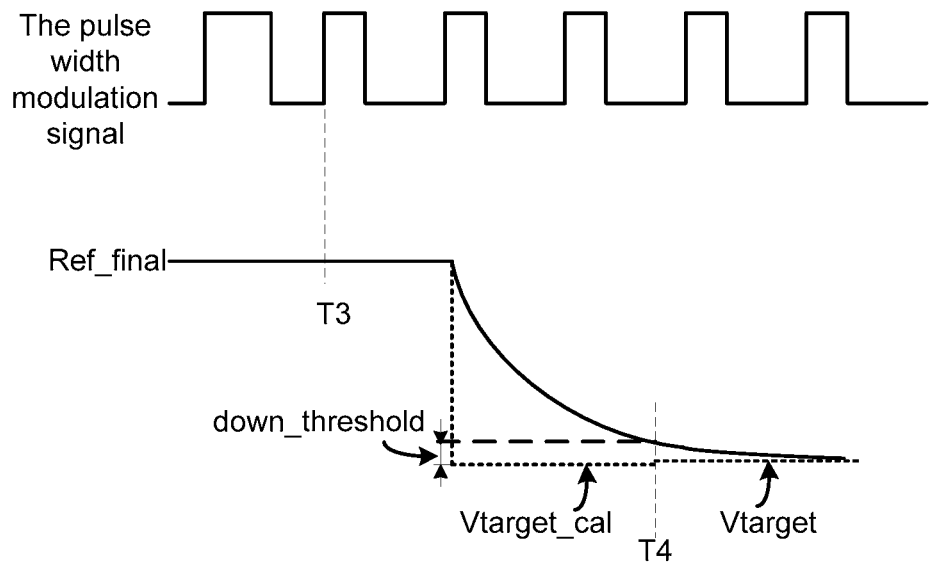
FIG. 3 shows waveform of reference signal when duty cycle of voltage identification code decreases according to an embodiment of the present invention.

FIG. 3 shows waveform of reference signal Ref_final when duty cycle Duty of the pulse width modulation signal decreases according to an embodiment of the present invention. In the embodiment shown in FIG. 3, at time T3, voltage identification code PWM-VID varies, duty cycle Duty of the pulse width modulation signal decreases and it is judged that reference signal Ref_final demands dynamic regulation, e.g., dynamic decrease. After a second delay time period, duty signal Duty_info decreases, and target voltage Vtarget_cal decreases correspondingly. Reference signal Ref_final is provided via filtering duty signal Duty_info by the first function f1(Duty_info), e.g., reference signal Ref_final decreases with the first time constant. At time T4, reference signal Ref_final decreases to less than the sum of target voltage Vtarget_cal and falling threshold down_threshold, and reference signal Ref_final is recognized as in the range determined by target voltage Vtarget_cal. As a result, reference signal Ref_final is provided via filtering duty signal Duty_info by the second function f2(Duty_info), e.g., reference signal Ref_final changes with the second time constant to approach operating voltage Vtarget.

Embodiments shown in this invention could satisfy demanding of transient response for reference signal Ref_final when voltage identification code PWM-VID varies. Meanwhile accuracy of reference signal Ref_final is also assured. People with ordinary skill in the art should know that there are differences between duty signal Duty_info and duty cycle Duty, and between target voltage Vtarget_cal and operating voltage Vtarget. Accuracy of duty signal Duty_info and target voltage Vtarget_cal are influenced by a frequency of a system clock and a calculating precision. However, reference signal Ref_final will finally approach operating voltage Vtarget per the second function f2(Duty_info), and accuracy of reference signal Ref_final will not be influenced by duty signal Duty_info and target voltage Vtarget_cal.

Figure 4:
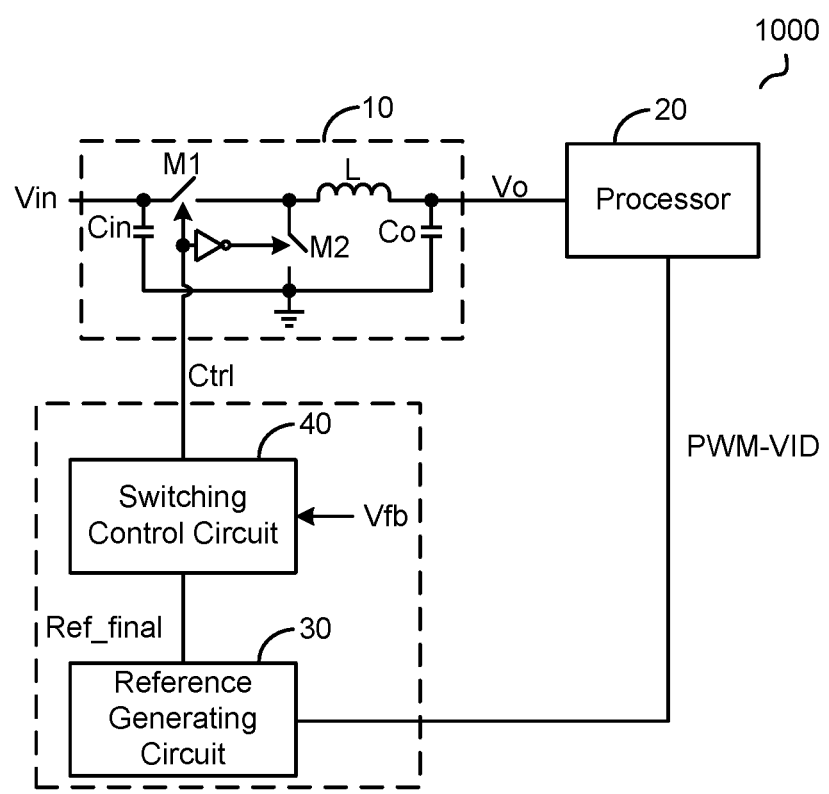
FIG. 4 illustrates a circuit block diagram of a voltage regulator 1000 according to an embodiment of the present invention.

FIG. 4 illustrates a circuit block diagram of a voltage regulator 1000 according to an embodiment of the present invention. Voltage regulator 1000 comprises a switching circuit 10, a control circuit comprising a reference generating circuit 30 and a switching control circuit 40. Switching circuit 10 comprising at least one power switch is configured to convert an input voltage Vin to an output voltage Vo based on reference signal Ref_final. Output voltage Vo is coupled to a processor 20 to provide operating voltage Vtarget. Reference generating circuit 30 is coupled to processor 20 to receive voltage identification code PWM-VID, and is configured to provide reference signal Ref_final based on voltage identification code PWM-VID. In one embodiment, reference signal Ref_final changes with the first time constant when voltage identification code PWM-VID varies. And reference signal Ref_final changes with the second time constant when reference signal Ref_final is in the range determined by target voltage Vtarget_cal. In one embodiment, when voltage identification code PWM-VID varies, reference signal Ref_final linearly changes to the range determined by target voltage Vtarget_cal with maximum rate R max; and after reference signal Ref_final in the range determined by target voltage Vtarget_cal, reference signal Ref_final is provided via filtering duty signal Duty_info, and slew rate of reference signal Ref_final is less than maximum rate R max. Switching control circuit 40 is configured to provide a switching control signal Ctrl to control the at least one power switch in switching circuit 10 based on reference signal Ref_final and a feedback signal Vfb representative of output voltage Vo.

Figure 5:
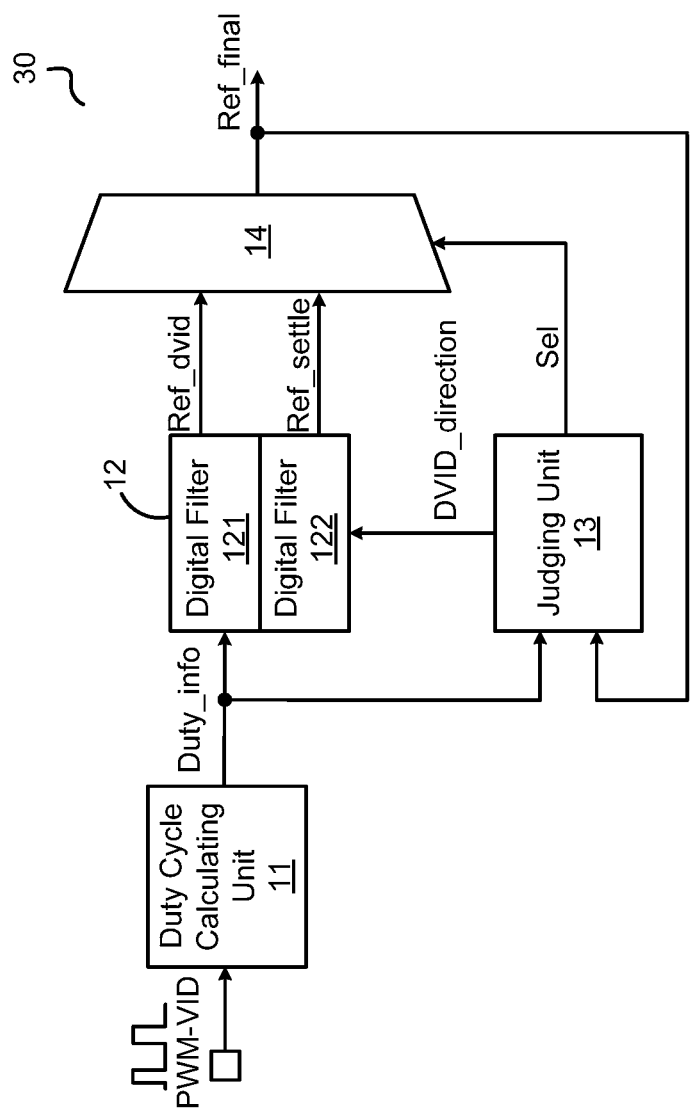
FIG. 5 schematically illustrates a reference generating circuit 30 according to an embodiment of the present invention.

FIG. 5 schematically illustrates reference generating circuit 30 according to an embodiment of the present invention. Reference generating circuit 30 receives voltage identification code PWM-VID, and provides reference signal Ref_final based on voltage identification code PWM-VID. Reference signal Ref_final may be either a digital signal or an analog signal. Reference generating circuit 30 comprises a duty cycle calculating unit 11, a filtering unit 12, a judging unit 13, and a multiplexer 14.

Duty cycle calculating unit 11 receives voltage identification code PWM-VID, and provides duty signal Duty_info via detecting a time period during which voltage identification code PWM-VID maintains at the high voltage level. In one embodiment, a timing signal PeriodH is obtained based on the time period during which voltage identification code PWM-VID maintains at the high voltage level, a time signal PeriodL is obtained based on a time period during which voltage identification code PWM-VID maintains at a low voltage level, and duty signal Duty_info is provided based on timing signal PeriodH dividing the sum of time signals PeriodH and PeriodL, that is Duty_info=PeriodH/(PeriodH+PeriodL). Time signals PeriodH and PeriodL may be a 4-bit hexadecimal number. Duty signal Duty_info may be an 8-bit hexadecimal number.

In one embodiment, filtering unit 12 comprises a digital filter 121 and a digital filter 122. Digital filter 121 receives duty signal Duty_info, and provides dynamic signal Ref_dvid via filtering duty signal Duty_info by the first function f1(Duty_info). Digital filter 122 receives duty signal Duty_info, and provides static signal Ref_settle via filtering duty signal Duty_info by the second function f2(Duty_info). A bandwidth of digital filter 121 is larger than a bandwidth of digital filter 122. Digital filter 121 and digital filter 122 directly implement a mathematical algorithm, corresponding to desired function f1(Duty_info) or function f2(Duty_info), in its programming.

In one embodiment, function f1(Duty_info) may be implemented as equations (3) and (4) shown in a digital system.

$$\text{Ref\_filt}(n)=(V\max-V\min)*\text{Duty\_info}(n)+V\min \quad (3)$$

$$\text{Ref\_dvid}(n)=(1-k1)*\text{Ref\_dvid}(n-1)+k1*\text{Ref\_filt}(n) \quad (4)$$

Where, k1 is a filtering coefficient, n represents a current calculating period of the digital system and n−1 represents a previous calculating period of the digital system.

In one embodiment, function f1(Duty_info) may be implemented as: dynamic signal Ref_dvid increases or decreases with maximum rate R max until reference signal Ref_final is in the range determined by target voltage Vtarget_cal.

In one embodiment, function f2(Duty_info) may be implemented as equations (3) and (5) shown or as equations (3) and (6) shown in the digital system.

$$\text{Ref\_dvid}(n)=(1-k2)*\text{Ref\_dvid}(n-1)+k2*\text{Ref\_filt}(n) \quad (5)$$

$$\text{Ref\_settle}(n)=(1-k3)*\text{Ref\_settle}(n-1)+k4*\text{Ref\_filt}(n-1)+k5*\text{Ref\_filt}(n) \quad (6)$$

Where k2-k5 are filtering coefficients.

Function f2(Duty_info) helps to reduce influence on reference signal Ref_final from the system clock and other external factors.

In the embodiment shown in FIG. 5, judging unit 13 receives duty signal Duty_info and reference signal Ref_final, and provides selection signal Sel based on duty signal Duty_info and reference signal Ref_final. Multiplexer 14 receives dynamic signal Ref_divd, static signal Ref_settle, and selection signal Sel, and provides reference signal Ref_final selectively based on one of dynamic signal Ref_dvid and static signal Ref_settle under control of selection signal Sel. In one embodiment, when voltage identification code PWM-VID varies, it is judged that reference signal Ref_final demands dynamic regulation, selection signal Sel is configured to control multiplexer 14 to provide reference signal Ref_final based on dynamic signal Ref_dvid, i.e., reference signal Ref_final is provided via filtering duty signal Duty_info by digital filter 121. In one embodiment, when it is judged that reference signal Ref is in the range determined by target voltage Vtarget_cal, reference signal Ref_final transits to static regulation from dynamic regulation, selection signal Sel is configured to control multiplexer 14 to provide reference signal Ref_final based on static signal Ref_settle, i.e., reference signal Ref_final is provided via filtering duty signal Duty_info by digital filter 122.

In one embodiment, judging unit 13 is further configured to judge a regulation direction of reference signal Ref_final, and provide direction signal DVID_direction to filtering unit 12 accordingly. In one embodiment, when direction signal DVID_direction indicates that the regulation direction of reference signal Ref_final is increasing, dynamic signal Ref_dvid is obtained based on filtering the sum of duty signal Duty_info and a compensation signal CMP by digital filter 121, that is Ref_dvid=f1(Duty_info+CMP). And function f1(Duty_info+CMP) may be implemented as equations (4) and (7) shown in the digital system.

$$\text{Ref\_filt}(n)=(V\max-V\min)*[\text{Duty\_info}(n)+\text{CMP}]+V\min \qquad (7)$$

Figure 6:
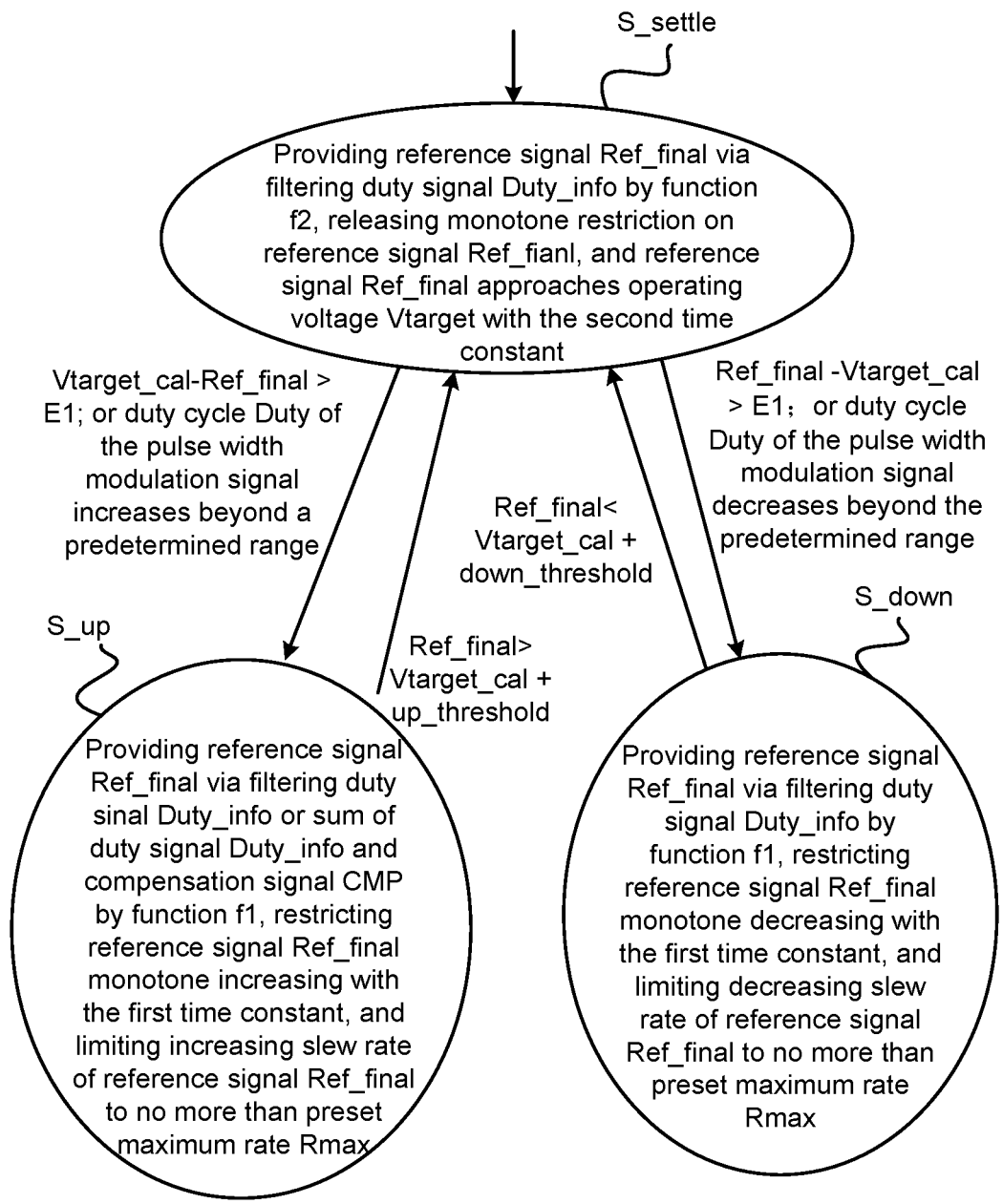
FIG. 6 shows a state transition diagram of reference generating circuit 30 according to an embodiment of the present invention.

FIG. 6 shows a state transition diagram of reference generating circuit 30 according to an embodiment of the present invention. In the embodiment shown in FIG. 6, reference generating circuit 30 has three states: a static regulation state S_settle, a dynamic increasing state S_up, and a dynamic decreasing state S_down. In one embodiment, reference generating circuit 30 is in static regulation state S_settle initially. When target voltage Vtarget_cal minus reference signal Ref_final is larger than preset value E1, or when duty cycle Duty of the pulse width modulation signal increases beyond a predetermined range, it is judged that reference signal Ref_final demands dynamic increasing regulation, and reference generating circuit 30 enters dynamic increasing state S_up from static regulation state S_settle. When reference signal Ref_final minus target voltage Vtarget_cal is larger than preset value E1, or when duty cycle Duty of the pulse width modulation signal decreases beyond the predetermined range, it is judged that reference signal Ref_final demands dynamic decreasing regulation, and reference generating circuit 30 enters dynamic decreasing state S_down from static regulation state S_settle. In dynamic increasing state S_up, when reference signal Ref_final is in the range determined by target voltage Vtarget_cal, for example, when reference signal Ref_final is larger than the sum of target voltage Vtarget_cal and rising threshold up_threshold, reference generating circuit 30 transits to static regulation state S_settle from dynamic increasing state S_up. In dynamic decreasing state S_down, when reference signal Ref_final is in the range determined by target voltage Vtarget_cal, for example, when reference signal Ref_final is less than the sum of target voltage Vtarget_cal and falling threshold down_threshold, reference generating circuit 30 transits to static regulation state S_settle from dynamic decreasing state S_down.

In one embodiment, dynamic increasing state S_up comprises: providing reference signal Ref_final via filtering duty signal Duty_info or the sum of duty signal Duty_info and compensation signal CMP by function f1, restricting reference signal Ref_final monotone increasing with the first time constant, and limiting increasing slew rate of reference signal Ref_final to no more than maximum rate R max. In one embodiment, dynamic decreasing state S_down comprises: providing reference signal Ref_final via filtering duty signal Duty_info by function f1, restricting reference signal Ref_final monotone decreasing, and limiting decreasing slew rate of reference signal Ref_final to no more than maximum rate R max. In one embodiment, static regulation state S_settle comprises: providing reference signal Ref_final via filtering duty signal Duty_info by function f2, releasing monotone restriction on reference signal Ref_final, and reference signal Ref_final approaches operating voltage Vtarget with the second time constant.

Monotone increasing means that reference signal Ref_final increases or stays without decreasing, and monotone decreasing means that reference signal Ref_final decreases or stays without increasing.

Figure 7:
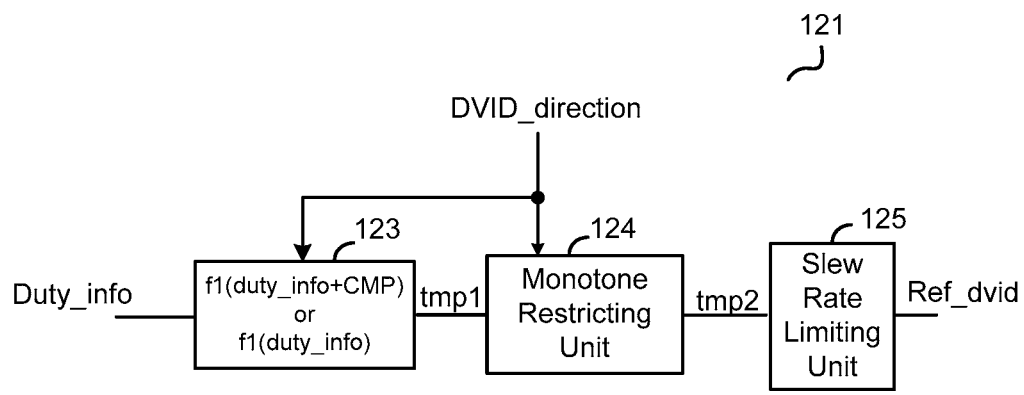
FIG. 7 schematically illustrates a digital filter 121 according to an embodiment of the present invention.

FIG. 7 schematically illustrates digital filter 121 according to an embodiment of the present invention. In the embodiment shown in FIG. 7, digital filter 121 comprises a filtering unit 123, a monotone restricting unit 124, and a slew rate limiting unit 125. Filtering unit 123 receives duty signal Duty_info and direction signal DVID_direction, and provides filtered signal tmp1. In one embodiment, when direction signal DVID_direction indicates that the regulation direction of reference signal Ref_final is increasing, filtered signal tmp1 is provided via filtering the sum of duty signal Duty_info and compensation signal CMP by function f1. In one embodiment, when direction signal DVID_direction indicates that the regulation direction of reference signal Ref_final is decreasing, filtered signal tmp1 is provided via filtering duty signal Duty_info by function f1. Monotone restricting unit 124 receives direction signal DVID_direction and filtered signal tmp1, and provides monotone signal tmp2 via restricting filtered signal tmp1 based on direction signal DVID_direction. In one embodiment, when direction signal DVID_direction indicates that the regulation direction of reference signal Ref_final is decreasing, monotone signal tmp2 is provided by restricting filtered signal tmp1 monotone decreasing. In one embodiment, when the regulation direction of reference signal Ref_final is decreasing, monotone signal tmp2 equals filtered signal tmp1 if filtered signal tmp1 is less than monotone signal tmp2 and monotone signal tmp2 keeps its value if filtered signal tmp1 is larger than monotone signal tmp2. In one embodiment, when direction signal DVID_direction indicates that the regulation direction of reference signal Ref_final is increasing, monotone signal tmp2 is provided by restricting filtered signal tmp1 monotone increasing. In one embodiment, when the regulation direction of reference signal Ref_final is increasing, monotone signal tmp2 equals filtered signal tmp1 if filtered signal tmp1 is larger than monotone signal tmp2 and monotone signal tmp2 keeps its value if filtered signal tmp1 is less than monotone signal tmp2. Slew rate limiting unit 125 receives monotone signal tmp2, and provides dynamic signal Ref_dvid via limiting slew rate of monotone signal tmp2 less than or equaling maximum rate R max.

Figure 8:
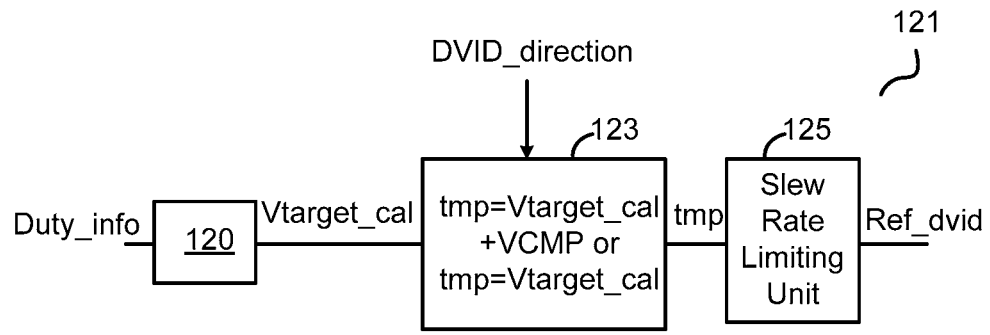
FIG. 8 schematically illustrates a digital filter 121 according to another embodiment of the present invention.

FIG. 8 schematically illustrates digital filter 121 according to another embodiment of the present invention. In the embodiment shown in FIG. 8, digital filter 121 comprises a calculating unit 120, filtering unit 123, and slew rate limiting unit 125. Calculating unit 120 receives duty signal Duty_info, and provides target voltage Vtarget_cal accordingly, e.g., as equation (2) shown. Filtering unit 123 receives target voltage Vtarget_cal and direction signal DVID_direction, and provides filtered signal tmp. In one embodiment, when direction signal DVID_direction indicates that the regulation direction of reference signal Ref_final is increasing, filtered signal tmp equals the sum of target voltage Vtarget_cal and a compensation signal VCMP. In one embodiment, when direction signal DVID_direction indicates that the regulation direction of reference signal Ref_final is decreasing, filtered signal tmp equals target voltage Vtarget_cal.

Slew rate limiting unit 125 receives filtered signal tmp and provides dynamic signal Ref_dvid via limiting slew rate of filtered signal tmp less than or equaling maximum rate R max In the embodiment shown in FIG. 8, when target voltage Vtarget_cal is larger than reference signal Ref_final, dynamic signal Ref_dvid increases with maximum rate R max; and when target voltage Vtarget_cal is less than reference signal Ref_final, dynamic signal Ref_divd decreases with maximum rate R max.

Figure 9:
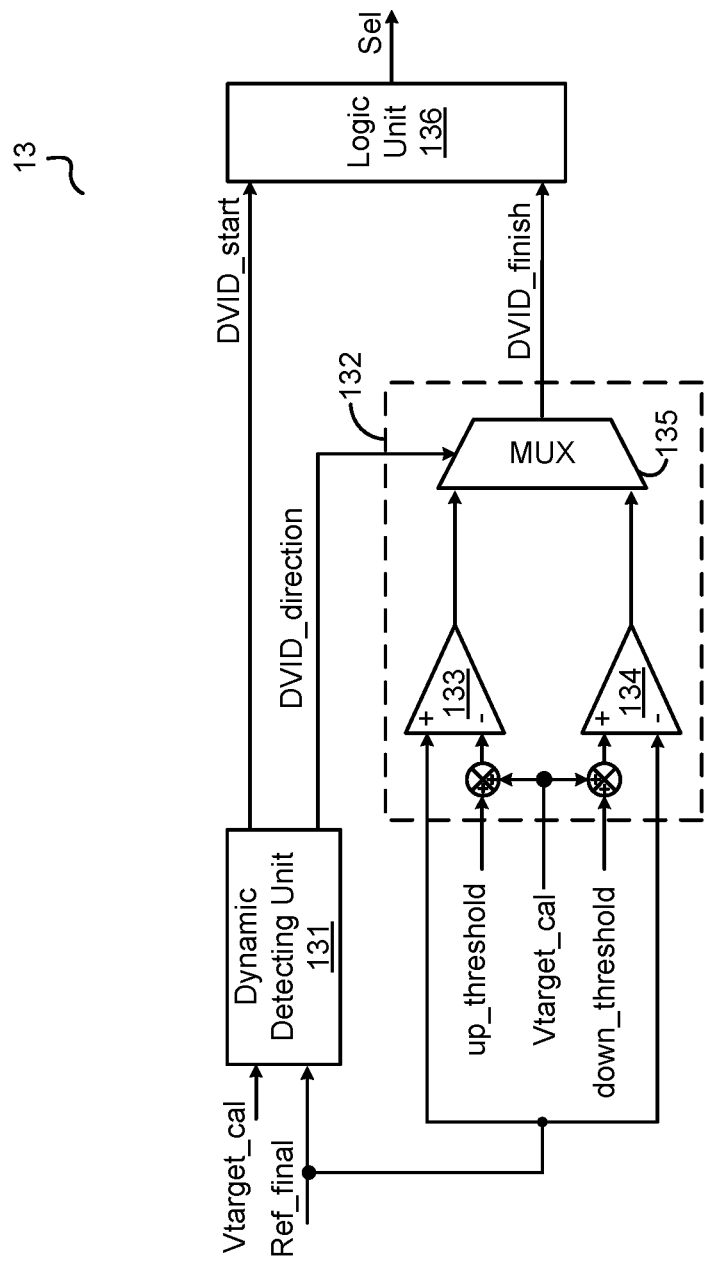
FIG. 9 schematically illustrates a judging unit 13 according to an embodiment of the present invention.

FIG. 9 schematically illustrates judging unit 13 according to an embodiment of the present invention. Judging unit 13 comprises a dynamic detecting unit 131, a static detecting unit 132 and a logic unit 136.

Dynamic detecting unit 131 judges if voltage identification code PWM-VID varies and provides dynamic start signal DVID_start based on target voltage Vtarget_cal and reference signal Ref_final. Dynamic detecting unit 131 further judges the regulation direction of reference signal Ref_final and provides direction signal DVID_direction based on target voltage Vtarget_cal and reference signal Ref_final. In one embodiment, when the difference between target voltage Vtarget_cal and reference signal Ref_final is larger than preset value E1, dynamic start signal DVID_start indicates that voltage identification code PWM-VID varies. In one embodiment, when target voltage Vtarget_cal is larger than reference signal Ref_final, direction signal DVID_direction indicates that the regulation direction of reference signal Ref_final is increasing. In one embodiment, when target voltage Vtarget_cal is less than reference signal Ref_final, direction signal DVID_direction indicates that the regulation direction of reference signal Ref_final is decreasing.

Static detecting unit 132 judges if reference signal Ref_final is in the range determined by target voltage Vtarget_cal and provides dynamic finish signal DVID_finish based on target voltage Vtarget_cal and reference signal Ref_final. In one embodiment, when direction signal DVID_direction indicates that the regulation direction of reference signal Ref_final is increasing, and when reference signal Ref_final is larger than the sum of target voltage Vtarget_cal and rising threshold up_threshold, dynamic finish signal DVID_finish indicates that reference signal Ref_final is in the range determined by target voltage Vtarget_cal, dynamic regulation of reference signal Ref_final finished. In one embodiment, when direction signal DVID_direction indicates that the regulation direction of reference signal Ref_final is decreasing, and when reference signal Ref_final is less than the sum of target voltage Vtarget_cal and falling threshold down_threshold, dynamic finish signal DVID_finish indicates that reference signal Ref_final is in the range determined by target voltage Vtarget_cal, dynamic regulation of reference signal Ref_final finished. In the embodiment shown in FIG. 9, static detecting unit 132 comprises a comparison unit 133, a comparison unit 134, and a multiplexer 135. Comparison unit 133 compares the sum of target voltage Vtarget_cal and rising threshold up_threshold with reference signal Ref_final, comparison unit 134 compares the sum of target voltage Vtarget_cal and falling threshold down_threshold with reference signal Ref_final, and multiplexer 135 is configured to select one of a comparison result of comparison unit 133 and a comparison result of comparison unit 134 based on direction signal DVID_direction.

Logic unit 136 provides selection signal Sel based on dynamic start signal DVID_start and dynamic finish signal DVID_finish. In one embodiment, when dynamic finish signal DVID_finish indicates that reference signal Ref_final is in the range determined by target voltage Vtarget_cal, reference signal Ref_final transits to static regulation, and multiplexer 14 shown in FIG. 5 selects static signal Ref_settle as reference signal Ref_final. In one embodiment, when dynamic start signal DVID_start indicates that voltage identification code PWM-VID varies, reference signal Ref_final transits to dynamic regulation, and multiplexer 14 shown in FIG. 5 selects dynamic signal Ref_dvid as reference signal Ref_final.

Figure 10:
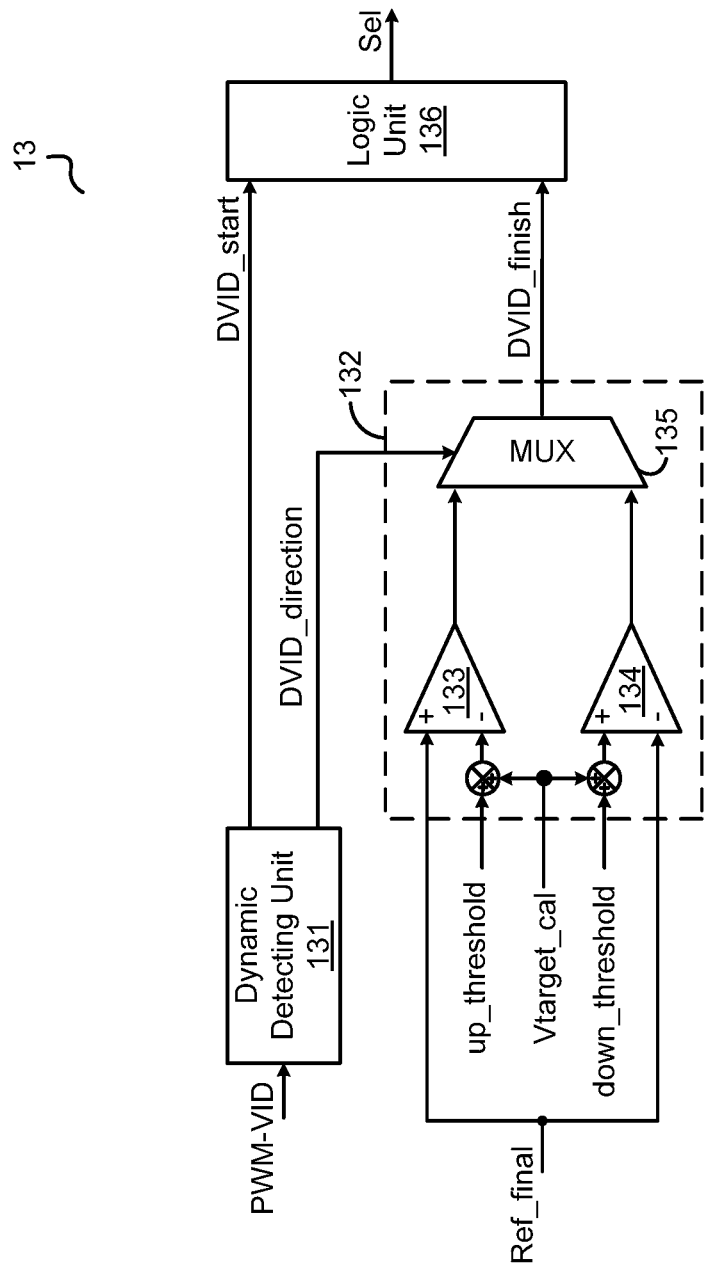
FIG. 10 schematically illustrates a judging unit 13 according to an embodiment of the present invention.

FIG. 10 schematically illustrates judging unit 13 according to another embodiment of the present invention.

In the embodiment shown in FIG. 10, dynamic detecting unit 131 judges if voltage identification code PWM-VID varies based on duty signal Duty_info and provides dynamic start signal DVID_start. Dynamic detecting unit 131 further judges the regulation direction of reference signal Ref_final and provides direction signal DVID_direction. In one embodiment, when variation of duty signal Duty_info exceeds a predetermined range, dynamic start signal DVID_start indicates that voltage identification code PWM-VID varies. When duty signal Duty_info increases, direction signal DVID_direction indicates that the regulation direction of reference signal Ref_final is increasing; and when duty signal Duty_info decreases, direction signal DVID_direction indicates that the regulation direction of reference signal Ref_final is decreasing.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A method for controlling a voltage regulator, wherein the voltage regulator has a power switch and the voltage regulator is configured to convert an input voltage to an output voltage based on a reference signal, the method comprising:
    receiving a voltage identification code, the voltage identification code comprising a pulse width modulation signal;
    providing a duty signal via measuring a duty cycle of the pulse width modulation signal;
    calculating a target voltage corresponding to the voltage identification code based on the duty signal;
    providing the reference signal via filtering the duty signal by a first filter if the voltage identification code varies;
    providing the reference signal via filtering the duty signal by a second filter if the reference signal is in a range determined by the target voltage, and a bandwidth of the first filter is larger than a bandwidth of the second filter; and
    providing a switching control signal to control the power switch based on the reference signal and a feedback signal representative of the output voltage.

2. The method of claim 1, wherein the reference signal is recognized as in the range determined by the target voltage if the reference signal increases to larger than the sum of the target voltage and a rising threshold, wherein the rising threshold is larger than or equal to zero.

3. The method of claim 1, wherein the reference signal is recognized as in the range determined by the target voltage if the reference signal decreases to less than the sum of the target voltage and a falling threshold, wherein the falling threshold is larger than or equal to zero.

4. The method of claim 1, wherein providing the reference signal via filtering the duty signal by the first filter comprises that the reference signal linearly changes into the range determined by the target voltage with a preset maximum rate.

5. The method of claim 1, wherein it is judged that the voltage identification code varies when a difference between the target voltage and the reference signal is larger than a preset value.

6. The method of claim 1, wherein it is judged that the voltage identification code varies when variation of the duty cycle of the pulse width modulation signal exceeds a preset range different from the range determined by the target voltage.

7. The method of claim 1, wherein the target voltage increases when the duty signal increases, and the target voltage decreases when the duty signal decreases.

8. A control circuit for a voltage regulator, wherein the voltage regulator has a power switch and the voltage regulator is configured to provide an output voltage based on a reference signal, the control circuit comprising:
   a reference generating circuit, configured to receive a voltage identification code and to provide the reference signal based on the voltage identification code, wherein the reference signal is provided by a first filter if the voltage identification code varies, and the reference signal is provided by a second filter if the reference signal is in a range determined by a target voltage corresponding to the voltage identification code, and a bandwidth of the first filter is larger than a bandwidth of the second filter, wherein the voltage identification code comprises a pulse width modulation signal, the reference generating circuit comprises a duty cycle calculating unit configured to provide a duty signal representative of a duty cycle of the pulse width modulation signal, the first filter is configured to receive the duty signal and provide a dynamic signal via filtering the duty signal, the second filter is configured to receive the duty signal and provide a static signal via filtering the duty signal, the reference generating circuit is configured to provide the reference signal based on the static signal if it is judged that the reference signal is in the range determined by the target voltage, otherwise the reference generating circuit is configured to provide the reference signal based on the dynamic signal; and
   a switching control circuit, configured to provide a switching control signal to control the power switch based on the reference signal and a feedback signal representative of the output voltage.

9. The control circuit of claim 8, wherein the voltage identification code comprises the pulse width modulation signal, and wherein the target voltage is calculated based on the duty cycle of the pulse width modulation signal.

10. The control circuit of claim 8, wherein the reference generating circuit is further configured to judge a regulation direction of the reference signal based on the reference signal and the target voltage.

11. The control circuit of claim 8, wherein the first filter is configured to provide the dynamic signal via filtering the sum of the duty signal and a compensation signal when a regulation direction of the reference signal is judged as increasing.

12. The control circuit of claim 8, wherein the first filter further comprises:
   a filtering unit, configured to receive the duty signal and provide a filtered signal based on the duty signal;
   a monotone restricting unit, configured to receive the filtered signal, the monotone restricting unit is configured to provide a monotone signal based on the filtered signal, wherein when a regulation direction of the reference signal is decreasing, the monotone signal equals the filtered signal if the filtered signal is less than the monotone signal and the monotone signal keeps its value if the filtered signal is larger than the monotone signal, and wherein when a regulation direction of the reference signal is increasing, the monotone signal equals the filtered signal if the filtered signal is larger than the monotone signal and the monotone signal keeps its value if the filtered signal is less than the monotone signal; and
   a slew rate limiting unit, configured to receive the monotone signal and provide the dynamic signal via limiting a slew rate of the monotone signal less than or equaling the preset maximum rate.

13. The control circuit of claim 8, wherein the first filter further comprises:
   a calculating unit, configured to receive the duty signal and provide the target voltage based on the duty signal;
   a filtering unit, configured to receive the target voltage and provide a filtered signal based on the target voltage, wherein the filtered signal equals the sum of the target voltage and a compensation signal when a regulation direction of the reference signal is increasing, and the filtered signal equals the target voltage when the regulation direction of the reference signal is decreasing; and
   a slew rate limiting unit, configured to receive the filtered signal and provide the dynamic signal via limiting a slew rate of the filtered signal to less than or equal to the preset maximum rate.

14. The control circuit of claim 8, wherein the reference generating circuit further comprises:
   a dynamic detecting unit, configured to judge a regulation direction of the reference signal based on the target voltage and the reference signal; wherein
   the regulation direction is judged as increasing when the target voltage minus the reference signal is larger than a preset value; and wherein
   the regulation direction is judged as decreasing when the reference signal minus the target voltage is larger than the preset value.

15. The control circuit of claim 8, wherein the reference generating circuit further comprises:
   a static detecting unit, configured to judge if the reference signal is in the range determined by the target voltage based on the target voltage and the reference signal; wherein
   if a regulation direction of the reference signal is increasing, the reference signal is judged as in the range determined by the target voltage when the reference signal is larger than the sum of the target voltage and a rising threshold; and wherein
   if the regulation direction of the reference signal is decreasing, the reference signal is judged as in the range determined by the target voltage when the reference signal is less than the sum of the target voltage and a falling threshold.

16. A method for controlling a voltage regulator, wherein the voltage regulator has a power switch which is turned ON and OFF to regulate an output voltage based on a reference signal, the method comprising:
- receiving a voltage identification code, the voltage identification code comprising a pulse width modulation signal;
- providing a duty signal via measuring a duty cycle of the pulse width modulation signal;
- providing the reference signal via filtering the duty signal by a first function if the voltage identification code varies;
- providing the reference signal via filtering the duty signal by a second function if the reference signal is in a range determined by a target voltage corresponding to the voltage identification code; and
- providing a switching control signal to control the power switch based on the reference signal and a feedback signal representative of the output voltage.

17. The method of claim 16, wherein the reference signal changes with a first time constant if the voltage identification code varies, and the reference signal changes with a second time constant if the reference signal is in the range determined by the target voltage, and wherein the first time constant is smaller than the second time constant.

18. The method of claim 16, wherein if a regulation direction of the reference signal is increasing, the reference signal is recognized as in the range determined by the target voltage when the reference signal is larger than the sum of the target voltage and a rising threshold, wherein the rising threshold is larger than or equal to zero.

19. The method of claim 16, wherein if a regulation direction of the reference signal is decreasing, the reference signal is recognized as in the range determined by the target voltage when the reference signal is less than the sum of the target voltage and a falling threshold, wherein the falling threshold is larger than or equal to zero.

* * * * *